May 24, 1932.  J. E. HORSTE  1,860,247
MOWER ATTACHMENT FOR TRACTORS
Filed Sept. 2, 1930   3 Sheets-Sheet 1
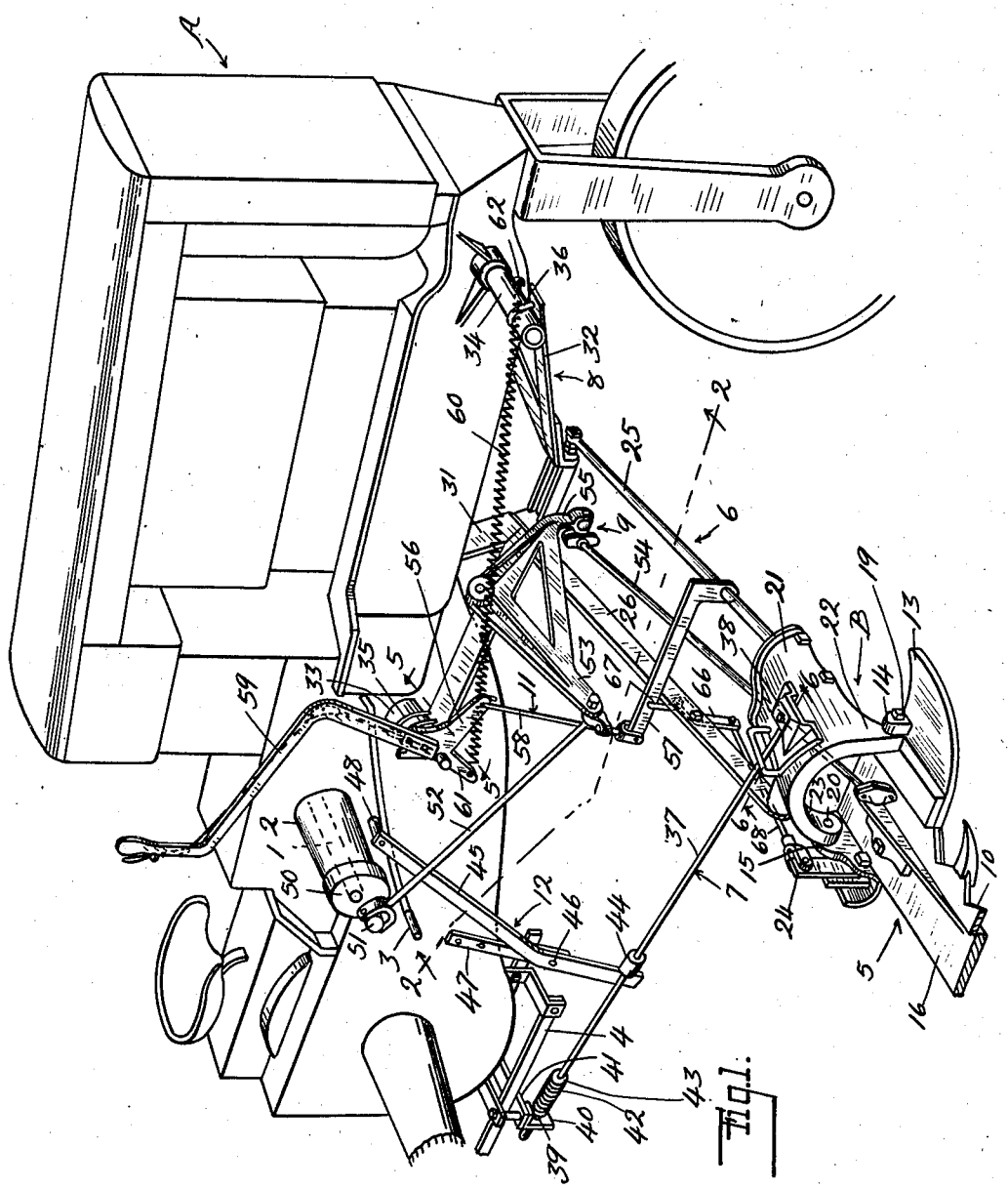
INVENTOR
Joseph E. Horste
BY
ATTORNEYS

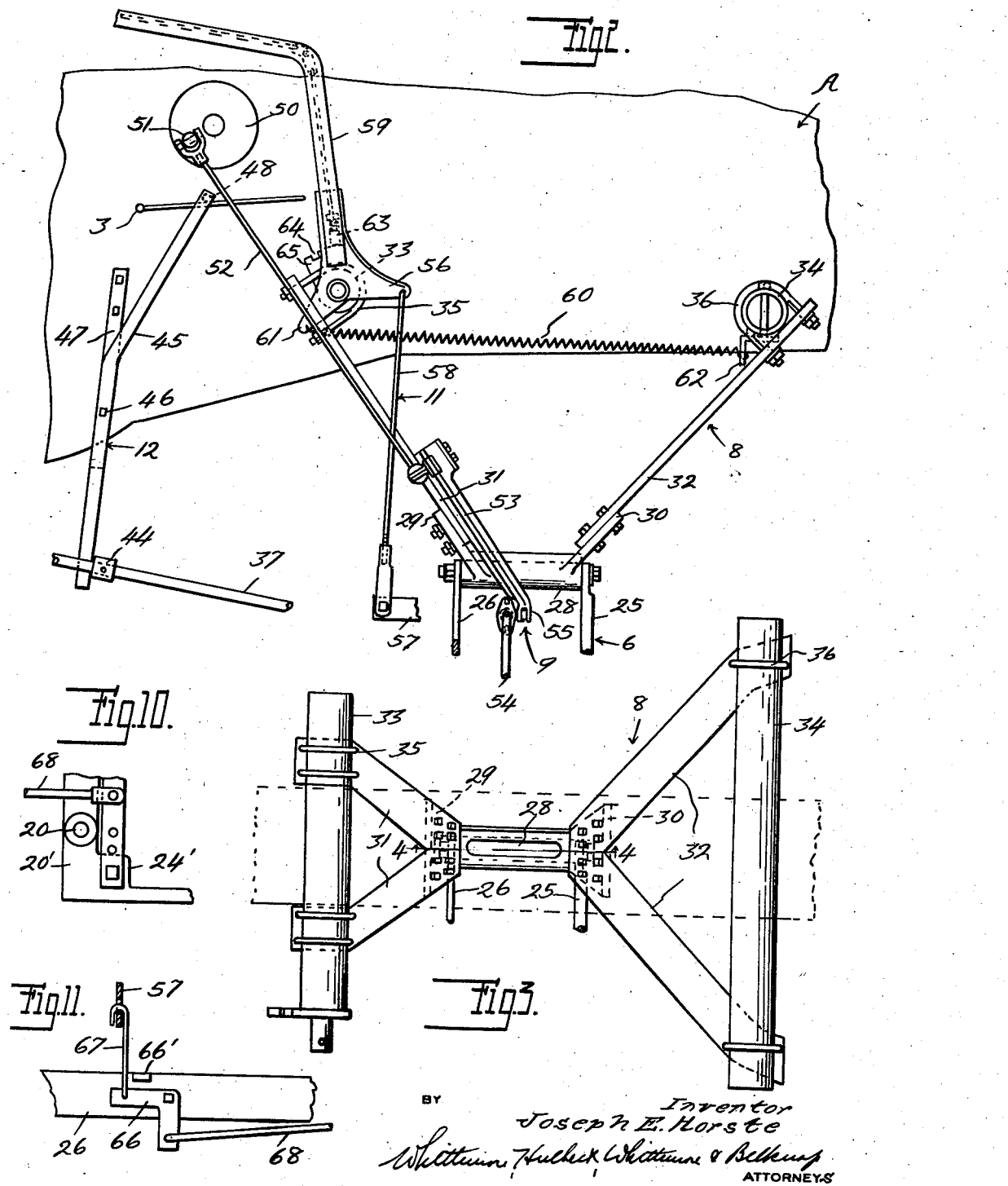

May 24, 1932. J. E. HORSTE 1,860,247
MOWER ATTACHMENT FOR TRACTORS
Filed Sept. 2, 1930 3 Sheets-Sheet 3
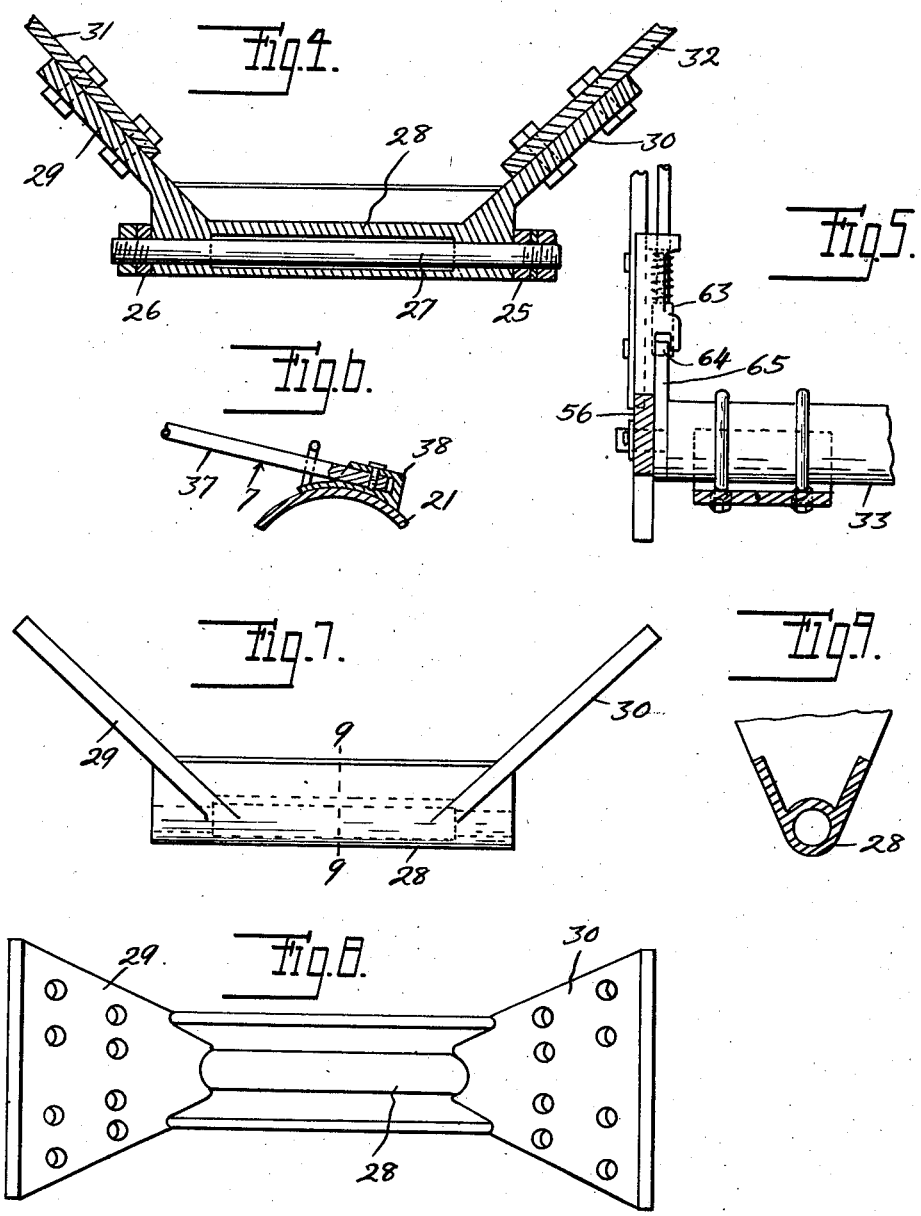

Patented May 24, 1932

1,860,247

UNITED STATES PATENT OFFICE

JOSEPH E. HORSTE, OF DETROIT, MICHIGAN, ASSIGNOR TO DETROIT HARVESTER COMPANY, OF DETROIT, MICHIGAN, A CORPORATION OF MICHIGAN

MOWER ATTACHMENT FOR TRACTORS

Application filed September 2, 1930. Serial No. 479,284.

This invention relates generally to mower attachments for motor driven vehicles such as tractors and the like.

One of the essential objects of the invention is to provide an attachment of this type in which a mower having a cutter bar or knife mounted for both reciprocable and pivotal movements is provided with both laterally and rearwardly extending bracing means which are connected to brackets suspended from the vehicle at spaced points longitudinally thereof.

Another object is to provide an attachment wherein one of the brackets aforesaid is suspended from rods or shafts extending transversely of the vehicle at spaced points longitudinally thereof and that is provided with a tubular portion that constitutes a bearing for a portion of the laterally extending bracing means aforesaid.

Another object is to provide an attachment wherein the means operable by the power take-off of the vehicle for reciprocating the cutter bar or knife includes a part pivotally mounted upon one of the brackets aforesaid.

Another object is to provide an attachment wherein the means for raising and lowering the knife or cutter bar about its pivot includes parts carried respectively by one of the rods or shafts and the laterally extending bracing means aforesaid.

Another object is to provide means that is associated with and is operable automatically by the rearwardly extending bracing means for rendering the power take-off inoperative for driving the reciprocating cutter bar of the mower when the ground engaging portions aforesaid of the mower encounter any sizable obstacle or obstruction.

Other objects, advantages, and novel details of construction of this invention will be made more apparent as this description proceeds, especially when considered in connection with the accompanying drawings, wherein:

Figure 1 is a fragmentary perspective view of a tractor with a mower attachment embodying my invention applied thereto;

Figure 2 is a sectional view taken on the line 2—2 of Figure 1;

Figure 3 is a top plan view of one of the brackets suspended from the vehicle;

Figure 4 is a sectional view taken on the line 4—4 of Figure 3;

Figure 5 is a sectional view taken on the line 5—5 of Figure 1;

Figure 6 is a sectional view taken on the line 6—6 of Figure 1;

Figure 7 is a side elevation of one of the brackets suspended from the vehicle;

Figure 8 is a top plan view of the bracket illustrated in Figure 7;

Figure 9 is a sectional view taken on the line 9—9 of Figure 7.

Figures 10 and 11 are detail views of a portion of the mechanism for raising and lowering the mower bar.

Referring now to the drawings, A is a tractor, and B is a mower attachment therefor embodying my invention. As shown, the tractor is of conventional form and has a power take-off shaft 1 at one side thereof, a tubular housing 2 for the shaft, a pivotally mounted control pedal 3 at one side of the vehicle for the power take-off, and a drawbar supporting bracket 4 suspended from the vehicle at the rear end thereof. The attachment B preferably comprises a mower 5, laterally and rearwardly extending bracing means 6 and 7 respectively, supporting means 8 for the laterally extending bracing means, means 9 operable by the power take-off shaft 1 for reciprocating the knife or cutter bar 10 of the mower 5, means 11 for raising and lowering the knife or cutter bar 10, and means 12 operable automatically by the rearwardly extending bracing means 7 for actuating the control pedal 3 to render the power take-off shaft 1 and drive means 9 inoperative for driving the cutter bar 10.

Referring to the mower 5, 13 is an inner ground engaging shoe provided at spaced points longitudinally thereof with upstanding lugs 14 and 15 respectively; 16 is a mower bar bolted to the shoe 13 between the lugs 14 and 15 and constituting a support for the knife 10; 19 and 20 respectively are pivot pins extending through the lugs 14 and 15; 21 is a yoke having spaced leg portions 22 and 23 respectively mounted upon the pivot pins 19 and 20; and 24 is an upstanding arm in advance of the pivot 20 and bolted at its lower end to an upstanding flange 24' of the mower bar 16.

The laterally extending bracing means 6 preferably comprises parallel bars 25 and 26 respectively and an intermediate shaft 27. As shown, the bars 25 and 26 are rigidly secured to the yoke 21 and are pivotally mounted upon the shaft 27 at opposite ends thereof. The shaft 27 is journaled in the tubular portion 28 of the bracket 8. Preferably the bracket 8 is a casting and is provided at opposite ends of the tubular portion 28 with upwardly diverging arms 29 and 30 respectively which are bolted to bars 31 and 32 respectively suspended from rods or shafts 33 and 34 respectively extending transversely of the vehicle at spaced points longitudinally thereof. Preferably U bolts 35 and 36 respectively straddle the shafts 33 and 34 and are rigidly secured to the bars 31 and 32 and constitute the suspension means therefor.

The rearwardly extending bracing means 7 preferably comprises a thrust rod or push bar 37 that is connected at its forward end to a saddle 38 on the yoke 21 and that extends through a suitable opening 39 in a depending portion 40 of a clamp 41 on the bracket 4. A coil spring 42 is sleeved upon a bar 37 between the depending portion 40 aforesaid and a nut 43 on the bar and serves as a cushion member for the latter in taking up thrust. Preferably a collar 44 is rigid with the bar 37 intermediate its ends and is adapted to swing a lever 45 about its pivot 46 on a bar 47 extending downwardly from the vehicle so that an arm 48 projecting laterally from the lever at its upper end may actuate the pedal 3. In this connection it will be noted that the pivotal connections between the shaft 27 and bars 25 and 26 respectively are such that the mower is permitted a limited rearward movement, approximately six inches. Under ordinary working conditions the coil spring 42 is able to hold the mower against such rearward movement; however, when the mower encounters a real obstacle or sizable obstruction it will move rearwardly against the tension of the spring 42, and in doing so will cause the collar 44 to swing the lever 46 so that the arm 48 will actuate the pedal 3 to render the power take-off inoperative for driving the reciprocating knife on the mower bar. Thus damage to the mower including the cutter bar is effectively prevented.

Referring to the driving means from the power take-off to the knife 10; 50 is a fly wheel rigid with the power take-off shaft 1 at the outer end thereof; 51 is an eccentric carried by the fly wheel 50; 52 is a substantially triangular shape rocker pivotally mounted upon the arm 31 of the bracket 8; 52 is a link terminally connected to the eccentric 51 and to the arm 53 of the rocker; and 54 is a pitman terminally connected to the arm 55 of the rocker and to the knife 10 whereby upon rotation of the power shaft 1 the rocker 52 will be swung about its pivot and will cause the pitman rod 54 to reciprocate the knife 10 on the mower bar 16.

Referring to the means 11 for raising and lowering the mower bar 16 and knife 10; 56 is a lever pivotally mounted upon the shaft 33; 57 is a lever pivotally mounted upon the bar 25; 58 is a link terminally connected to the levers 56 and 57 respectively; 59 is an operating handle for the lever 56; 60 is a balancing spring terminally connected to an extension 61 of the lever 56 and to a bracket 62 carried by the shaft 34; 63 is a latch carried by the lever 56 and engageable with a recess 64 in a segment 65 rigid with the shaft 33 for holding the lever 56 in a raised position; 66 is a lever pivotally mounted upon the bar 26 and engageable with a lug 66' projecting laterally from the bar 26; 67 is a link terminally connected to the lever 66 and to the lever 57; and 68 is a link terminally connected to the lever 66 and to the arm 24. Thus when the mower is in operation or in lowered ground engaging position the latch 63 rides freely upon the arcuate upper edge of the segment 65; the lever 66 is spaced below the lug 66' on the bar 26; and the arm 24 is in an upright position in spaced relation to the bearing 20' for the pivot 20. However, when the operating handle 59 is pulled rearwardly the links 58, 67 and 68 respectively will be moved longitudinally and will cause the levers 57 and 66 and arm 24 respectively to be actuated so that the mower will be raised free of the ground. For instance, when the arm 24 is pulled rearwardly by the link 68, the arm will fulcrum on the bearing 20' for the pivot 20 and will cause the mower bar 16, shoe 13 and knife 10 to swing as a unit about the pivots 19 and 20. While the arm 24 is being pulled by the link 68, the lever 66 is being raised by the link 67 so that it abuts the lug 66' and causes the bars 25 and 26 and mower at the outer end thereof to be raised free of the ground. The latch 63 then engages the recess 64 in the segment and causes the parts aforesaid to be held in raised position.

While it is believed that from the foregoing description the nature and advantages of the invention will be readily apparent, I desire to have it understood that I do not limit myself to what is herein shown and described, and that such changes may be resorted to when desired as fall within the scope of what is claimed.

What I claim as my invention is:

1. The combination with a motor driven vehicle, of a mower attachment therefor including a mower having a ground engaging shoe, a yoke carried by said shoe, a mower bar pivotally mounted on said shoe, a bracket suspended from the vehicle, a shaft carried by the bracket, a pair of bars terminally connected to said yoke and shaft, and means for swinging the mower bar, yoke and ground engaging shoe relative to the ground, including parts carried respectively by the bars aforesaid.

2. The combination with a motor driven vehicle, of a mower attachment therefor including a mower having a ground engaging shoe, a yoke pivotally connected to said shoe, a mower bar connected to said shoe, a bracket suspended from the vehicle, a rotary shaft journaled in the bracket, a pair of bars terminally connected to and rigid with said yoke and shaft, and means pivotally connected to one of said bars for swinging the shoe and mower bar relative to the yoke and subsequently raising the shoe, mower bar and yoke relative to the ground.

3. The combination with a motor driven vehicle, of a mower attachment therefor including a mower having a ground engaging shoe, a yoke carried by said shoe, a mower bar connected to said shoe, shafts extending transversely of the vehicle at spaced points longitudinally thereof, a bracket suspended from said shafts, a bracing connection between said yoke and bracket, means for moving the shoe and mower bar relative to the yoke and for subsequently raising the shoe, mower bar and yoke free of the ground, including an arm connected to the bar, and a lever mounted upon one of the shafts aforesaid and operatively connected to said arm, and means for holding the shoe, mower bar and yoke in raised position including a sector rigid with the shaft upon which the lever is mounted and having a recess therein, and a latch carried by said lever and engageable with the recess in said sector.

4. The combination with a motor driven vehicle, of a mower attachment therefor including a mower having a ground engaging shoe, a yoke carried by said shoe, a pair of shafts extending transversely of the vehicle at spaced points longitudinally thereof, a bracket suspended from said shafts and having a tubular portion, and a bracing connection between said yoke and bracket including a shaft journaled in the tubular portion, and a bar extending laterally from the yoke and connected to the shaft in said tubular portion.

5. The combination with a motor driven vehicle having a power take-off, of a mower attachment for the vehicle including a ground engaging shoe, a mower bar carried by said shoe, a reciprocating knife carried by said bar, a yoke carried by said shoe, a bracket suspended from the vehicle, a connection between said bracket and yoke, and a driving connection between said power take-off and knife including a pivotally mounted part carried by said bracket.

6. The combination with a motor driven vehicle having a power take-off, of a mower attachment for the vehicle including a ground engaging shoe, a mower bar carried by said shoe, a reciprocating knife carried by said bar, a yoke carried by said shoe, a bracket suspended from the vehicle, a connection between said bracket and yoke, and a driving connection between said power take-off and knife including a rocker shaft mounted on said bracket, and a pitman rod terminally connected to said rocker and to said knife.

7. The combination with a motor driven vehicle having a power take-off, and a control member therefor, of a mower attachment for the vehicle including a ground engaging shoe, a mower bar carried by said shoe, a reciprocating knife carried by said mower bar, a yoke carried by said shoe, brackets suspended from the vehicle at spaced points longitudinally thereof, bracing connections between said yoke and brackets, a driving connection between said power take-off and knife, and means associated with one of said bracing connections and adapted to actuate the control member aforesaid to render the power take-off inoperative for driving the knife when the mower encounters an obstruction.

8. The combination with a motor driven vehicle having a power take-off, and a control member therefor, of a mower attachment for the vehicle including a mower having a ground engaging shoe, a mower bar carried by said shoe, a reciprocating knife carried by said bar, a yoke carried by said shoe, brackets suspended from the vehicle at spaced points longitudinally thereof, a connection between said yoke and one of said brackets, a connection between said yoke and the other of said brackets including a thrust or push bar, a driving connection between said power take-off and knife, and means for actuating the control member to render the power take-off inoperative for driving the knife when the mower engages an obstacle, including a lever engageable with the control member, and an element carried by said push bar engageable with said lever.

9. The combination with a motor driven vehicle, of a mower attachment therefor including a mower having a ground engaging shoe, a yoke connected to said shoe, a mower bar connected to said shoe, a bracket suspended from the vehicle, a bracing connection between said bracket and yoke including a pair of bars, a lug projecting from one of said bars, and means for moving the shoe relative to the yoke and for subsequently raising the shoe, mower bar and yoke free from the ground including a lever pivotally connected to one of said bars and engageable with the lug aforesaid.

10. The combination with a motor driven vehicle, of a mower attachment therefor including a mower having a ground engaging shoe, a yoke connected to said shoe, a mower bar connected to said shoe, a bracket suspended from the vehicle, a bracing connection between said bracket and yoke including a pair of bars, a lug projecting from one of said bars, and means for moving the shoe relative to the yoke and for subsequently raising the shoe, mower bar and yoke free from the ground including an arm connected to the mower bar, a lever operatively connected to the arm and engageable with the lug aforesaid, and an operating member carried by the vehicle and connected to the lever.

11. The combination with a motor driven vehicle having a power take-off, of a mower attachment for the vehicle including a mower having a ground engaging shoe, a cutter associated with the shoe, a driving connection between the power take-off and cutter, a yoke carried by said shoe, brackets suspended from the vehicle at spaced points longitudinally thereof, a connection between said yoke and one of said brackets, a longitudinally movable rod extending from the yoke and having a yieldable sliding connection with the other bracket, and means rendered active by the last mentioned rod upon longitudinal movement thereof in one direction to render the driving connection aforesaid inactive.

In testimony whereof I affix my signature.

JOSEPH E. HORSTE.